US010896598B1

(12) United States Patent
Boss et al.

(10) Patent No.: US 10,896,598 B1
(45) Date of Patent: Jan. 19, 2021

(54) AMBIENT SITUATIONAL ABNORMALITY DETECTION AND RESPONSE

(71) Applicant: International Business Machines Corporation, Armonk, NY (US)

(72) Inventors: Gregory J. Boss, Saginaw, MI (US); Rhonda L. Childress, Austin, TX (US); Michael Bender, Rye Brook, NY (US); Matthew Johnson, Blaxland (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/733,449

(22) Filed: Jan. 3, 2020

(51) Int. Cl.
H04M 11/04 (2006.01)
G08B 25/01 (2006.01)
G06N 20/00 (2019.01)
G10L 15/26 (2006.01)
H04W 4/90 (2018.01)

(52) U.S. Cl.
CPC ........... *G08B 25/016* (2013.01); *G06N 20/00* (2019.01); *G10L 15/26* (2013.01); *H04W 4/90* (2018.02)

(58) Field of Classification Search
CPC ....... H04W 4/90; H04W 4/029; H04W 76/50; H04W 4/08; H04W 12/00505; G08B 25/10
See application file for complete search history.

(56) References Cited

U.S. PATENT DOCUMENTS

| 7,292,723 | B2 * | 11/2007 | Tedesco ................. A61P 29/00 382/159 |
| 8,373,552 | B2 | 2/2013 | Liberge |
| 10,147,306 | B2 | 12/2018 | Kinney et al. |
| 10,540,883 | B1 * | 1/2020 | Keil ..................... G08B 25/006 |

(Continued)

OTHER PUBLICATIONS

IP.com, an externally-undetected method with smart phone to help people reach help when facing a personal safety/security threat from violence, Oct. 27, 2018, https://ip.com/IPCOM/000255979.

(Continued)

*Primary Examiner* — Khalid W Shaheed
(74) *Attorney, Agent, or Firm* — Garg Law Firm, PLLC; Rakesh Garg; Brian Restauro

(57) ABSTRACT

An embodiment includes receiving, by a processor, a sensor signal from a monitoring sensor during a scheduled monitoring session for monitoring a first user. An embodiment includes processing, by the processor, the sensor signal using a machine learning (ML) model such that the ML model outputs an indication of whether the first user is experiencing a potential emergency. An embodiment includes performing, by the processor in response to the ML model indicating that the first user is experiencing a potential emergency, a verification routine that includes transmitting a verification request and, upon detecting a lack of response to the verification request within a predetermined amount of time, confirming the potential emergency as an actual emergency. An embodiment includes requesting, by the processor automatically in response to the verification routine confirming that the potential emergency is an actual emergency, dispatch of emergency services to a location of the first user.

17 Claims, 7 Drawing Sheets

(56) References Cited

U.S. PATENT DOCUMENTS

| | | | | |
|---|---|---|---|---|
| 2008/0304630 A1* | 12/2008 | Nguyen | ............... | G08B 25/006 379/45 |
| 2012/0282886 A1* | 11/2012 | Amis | ...................... | G06F 3/016 455/404.2 |
| 2017/0251347 A1* | 8/2017 | Mehta | .................. | H04M 3/5116 |
| 2017/0289350 A1* | 10/2017 | Philbin | ................ | G08B 25/016 |
| 2019/0358822 A1* | 11/2019 | Wojciechowski | ....... | B25J 9/163 |
| 2020/0059776 A1* | 2/2020 | Martin | .................. | G06F 3/0482 |

OTHER PUBLICATIONS

Motorola et al., Biological Hazard Alert System via Distributed Sensor Network, ip.com, Aug. 30, 2007, https://ip.com/IPCOM/000157695.

Match, Dating Safety Tips, 2019, https://www.match.com/help/safetytips.aspx?lid=4.

Andone et al., Suspect in murder and rape cases used dating websites to find victims, police say, CNN, Jul. 30, 2018, https://www.cnn.com/2018/07/29/us/danueal-drayton-dating-websites-new-york-california/index.html.

* cited by examiner

AMBIENT SITUATIONAL ABNORMALITY DETECTION AND RESPONSE

TECHNICAL FIELD

The present invention relates generally to applications for mobile devices. More particularly, the present invention relates to ambient situational abnormality detection and response.

BACKGROUND

Safety devices exist that can help people remain safe when faced with potentially hazardous conditions. For example, safety devices are available that can be used to visually alert others to a hazard, such as road flares set out to guide drivers away from a stranded vehicle. Other safety devices are available that can be used as an audible alert, such as whistles and air horns that can be used to draw attention to a situation and possibly deter misconduct. Many people regularly carry mobile phones that include the ability for a user to call 911 emergency services. However, such devices are only effective if the user is able to timely access them and put them to use. For example, depending on the nature of the emergency, the person involved might be delayed or prevented from contacting emergency services for a variety of reasons, for example due to injury or incapacitation, which can get worse if not timely addressed.

SUMMARY

The illustrative embodiments automatically detect and respond to emergency situations. An embodiment includes receiving, by a processor, a sensor signal from a monitoring sensor during a scheduled monitoring session for monitoring a first user. The embodiment includes processing, by the processor, the sensor signal using a machine learning (ML) model such that the ML model outputs an indication of whether the first user is experiencing a potential emergency. The embodiment includes performing, by the processor in response to the ML model indicating that the first user is experiencing a potential emergency, a verification routine that includes transmitting a verification request and, upon detecting a lack of response to the verification request within a predetermined amount of time, confirming the potential emergency as an actual emergency. The embodiment includes requesting, by the processor automatically in response to the verification routine confirming that the potential emergency is an actual emergency, dispatch of emergency services to a location of the first user. Other embodiments of this aspect include corresponding computer systems, apparatus, and computer programs recorded on one or more computer storage devices, each configured to perform the actions of the embodiment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
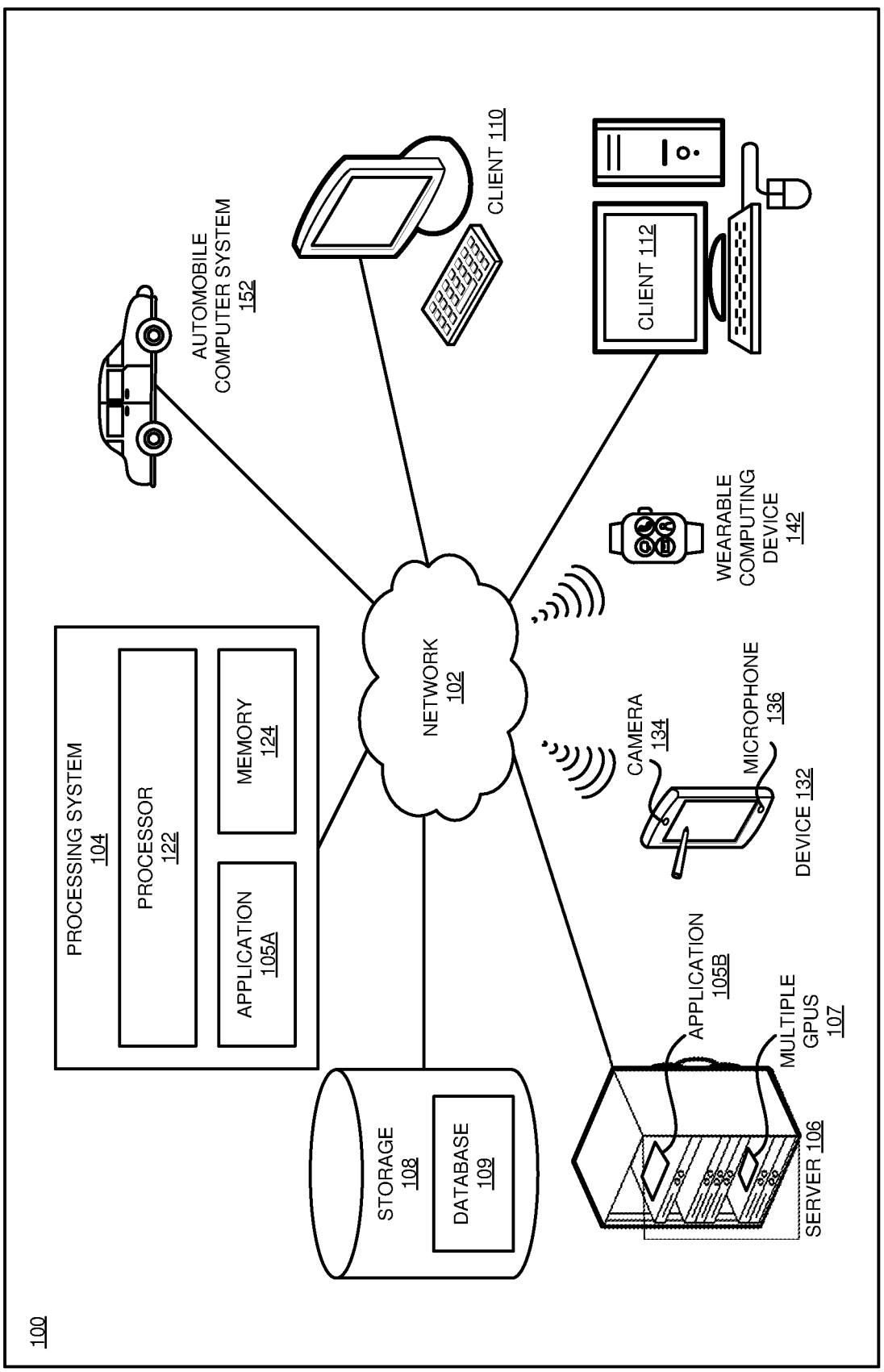
FIG. 1 depicts a block diagram of a network of data processing systems in which illustrative embodiments may be implemented.

Some forms of e-commerce involve an aspect that involves direct interaction with unfamiliar people and places. Examples include online delivery services that deliver products to customers, transportation services that provide rides to customers, travel accommodation services that provide lodging for customers, and dating services that provide a platform that allows customers to meet online and eventually meet in person. However, some users are hesitant to engage in such services due to safety concerns. This has led many such e-commerce businesses to conduct background checks on its service providers or other users to provide helpful information about a person's history to assess whether they may pose a threat to others.

Despite these efforts, there still remain potential customers who remain hesitant to use such services. While some consumers appreciate the added conveniences of many such e-commerce offerings, they remain hesitant to enjoy such conveniences if it requires what they view as increased risk acceptances. While changes like the background-check requirements are seen by some as an improvement, many view such assessments as being only of limited usefulness in terms of avoiding users with malicious intent. Thus, there remains a need to provide increased safety and security for users engaged in forms of e-commerce that involve direct interaction with unfamiliar people and places in order to make such services more easily adopted by users who currently remain reluctant.

The illustrative embodiments recognize that the presently available tools or solutions do not address these needs or provide adequate solutions for these needs. The illustrative embodiments used to describe the invention generally address and solve the above-described problems and other problems related to automatically detecting and responding to emergency situations.

The term "emergency," as used herein, generally refers to situations that pose a risk, such as a risk to health, life, property, or environment, or need for help, such as a need for roadside assistance, regardless of whether the need actually justifies prompt or immediate attention. Examples of an emergency include, without limitation, an injury or ailment, a structure or vehicle fire, or a stranded motorist due to a flat tire or a discharged battery, although what may be viewed as an emergency by the user or by a party acting on behalf of the user may not be viewed as an emergency by emergency personnel.

An embodiment can be implemented as a software application. The application implementing an embodiment can be configured as a modification of an existing Internet of Things (IoT) device, such as a security system, smart watch, or fitness monitor, or on a smartphone as a separate application that operates in conjunction with an existing system, a standalone application, or some combination thereof. Security systems are typically fixed in place for monitoring a particular area. In contrast, the illustrative embodiments provide a portable security system that a user can carry on their person and activate or deactivate the monitoring feature whenever the user feels the need for extra security.

Particularly, an illustrative embodiment provides a safety monitoring system for users of a form of e-commerce that involves direct interaction with an unfamiliar person. Non-limiting examples of such forms of e-commerce include peer-to-peer ridesharing, ride service hailing, delivery services, repair services, among others. When a user makes plans to meet someone in connection with an e-commerce activity or transaction, an embodiment allows the user to schedule a monitoring session that coincides with the meeting. During the monitoring session, the system automatically detects and responds to emergency situations.

In an embodiment, the system comprises a detection system that includes a monitoring sensor for monitoring a user by generating a sensor signal that is transmitted to a cognitive evaluation system. The evaluation system receives and processes the sensor signal to detect a "potential emergency," meaning a situation that the safety monitoring system has preliminarily detected as a possible emergency, subject to verification. A verification system automatically attempts to verify whether the detected potential emergency is an actual emergency situation by transmitting a verification request and, upon detecting a lack of response to the verification request within a predetermined amount of time, confirming the potential emergency as an actual emergency. If the verification system receives an emergency-confirming response to the verification request within the predetermined amount of time, the verification system confirmes the potential emergency as the actual emergency. If the verification system receives a no-emergency response (indicating that there is no emergency) to the verification request within the predetermined amount of time, the verification system cancels the potential emergency and monitoring continues. Otherwise, if the verification system confirms that the potential emergency is an actual emergency, then the system will automatically contact emergency services. Thus, in an embodiment, the system will err on the side of user safety and contact emergency services when it is unable to verify the detected potential emergency.

The term "media," as used herein, generally refers audio, images, video, and combinations thereof. Examples of media include, without limitation, sounds, speech, still images, and video generated by sensors such as microphones or cameras that output sensor signals in known media formats, such as known audio, image, and video formats.

The term "sensor," as used herein, generally refers to a converter that measures a physical quantity and converts it into a signal which can be read by an observer or by an instrument. Examples of a sensor include, without limitation, an image sensor such as a charge-coupled device (CCD) or a complementary metal-oxide semiconductor (CMOS) used for video and still-image cameras or an acoustic sensor that is used as a microphone.

The terms "monitor" and "monitoring," as used herein, generally refer to continuous or periodic analysis by data processing machines of one or more signals generated by one or more sensor responsive to conditions of the user or of the user's current environment and subject to the user's permission to do so. Embodiments include obtaining informed consent from a user to collect information and monitor the user such that the user must "opt-in" and explicitly agree to being monitored prior to any monitoring occurring; similarly, embodiments allow the user to opt-out of any such monitoring, which would result in no such monitoring taking place unless and until the user opts-in and allows monitoring to occur. In some embodiments, the system transmits a notification to the user prior to each time it collects, or uses user-collected, information about the user, and the notification includes an ability for the user to allow or prevent such activity to occur. Examples of monitoring include, without limitation, detecting an emergency situation by an audio signal from a sensor being carried by the user. Another example includes analyzing a video signal from an image sensor being carried by the user. Computer-based machine examples include cognitive systems that use machine-learning algorithms for image classification and/or natural language processing (NLP) to analyze audio and video signals from a sensor being carried by the user. Embodiments include systems configured to take into account local laws, to some extent, based upon GPS location.

In one example embodiment, a safety monitoring system includes a detection system that includes one or more monitoring sensors for monitoring a user. Embodiments of the detection system require some indication from the user confirming that the user has provided informed consent to collect information and monitor the user such prior to the detection system doing so. In some embodiments, the system transmits a notification to the user prior to each time it collects, or uses user-collected, information about the user, and the notification includes an ability for the user to allow or prevent such activity to occur. The monitoring sensors generate sensor signals based on sensed aspects of the user or the user's environment. In an embodiment, the monitoring system includes an application on a smartphone, and the monitoring system uses sensors on the smartphone, such as a microphone and camera. In such embodiments, the sensor signals include audio and/or video signals from the smartphone's microphone and camera.

In an embodiment, the detection system includes a biometric sensor usable by a first user for checking a medical condition of a second user. In such embodiments, the sensor signals include a biometric signal from the biometric sensor. In an embodiment, the biometric sensor signals are used to detect a medical emergency and/or to detect conditions such as stress or anxiety that suggest a potential emergency, such as a threat against the user.

An illustrative embodiment includes a user interface that allows a user to set up a block of time for a future monitoring session. In an embodiment, the user inputs a future start time and a future end time, and in response the detection system automatically begins and ends a monitoring session according to those times. In an embodiment, the safety monitoring system includes a GPS or other self-locating technology. In some such embodiments, the user provides a location for monitoring, and, in response, the monitoring system automatically begins a monitoring session when the user is within a threshold distance of the selected location, and ends when the user leaves the area and is beyond the threshold distance. Also, in some embodiments that include GPS or the like, the user provides location information and duration information, indicating that the user should be in a specific area for a certain amount of time. If the user prematurely appears to leave the area, the monitoring system will treat the early departure as an indication of a possible emergency.

In an embodiment, the system detects a potential emergency if the user deviates too far from an itinerary. For example, in an embodiment, the system monitors for an initial interaction with the unknown party. In an embodiment, the system detects a potential emergency if the initial interaction fails to be confirmed due to the user not arriving at the planned location at the planned time, or if the user fails to respond to a message from the system asking the user to manually confirm that the initial interaction has occurred. In an embodiment, the system detects a potential emergency if the user set up a third-party IoT device for confirming the initial meeting and the IoT device is unable to do so.

For example, in an embodiment, the system monitors for a planned end to the meeting (i.e., final interaction) with the unknown party. In an embodiment, the system stores a final interaction time previously provided by the user that coincides with when the user expects the interaction to end, and if the system detects that the user has not departed when the final interaction time passes, the system interprets this situation as a potential emergency. In an embodiment, the system sends a message with a configuration requiring a response within a time limit. The mobile device receives the message and initiates a timer for a response. When the mobile device does not receive an input in response to the message before the timer runs out, the mobile device causes no response to be transmitted in response to the message. The system determines—from not receiving the response within the time limit—that the nonreceipt of the response qualifies as a condition of potential emergency. When the system detects a potential emergency, the system causes the initiation of a verification process as described herein.

In an illustrative embodiment, the safety monitoring system monitors at least one monitoring sensor during active monitoring sessions. In an embodiment, the sensors generate media signals, such as audio and/or video, that gets monitored by human agents who watch and listen for signs of an emergency. In another embodiment, the detection system includes receiving image or video signals from a camera sensor monitoring the user. A machine-learning classifier model generates an indication of a potential emergency based on the prediction made by the classifier model in response to the input images or video. In some such embodiments, the detection system uses a classification model based on a neural network algorithm, for example a Convolutional Neural Network (CNN) or Deep Neural Networks (DNNs). During the configuration process, the detection system uses labelled images of various emergency and non-emergency situations to train the classification model to classify images as emergencies or non-emergencies.

In an illustrative embodiment, the safety monitoring system comprises a detection system that monitors the output of one or more monitoring sensors that monitor a user while the user has activated a monitoring session. In an embodiment, the detection system receives audio and/or video signals from a microphone or other audio sensor that is monitoring the user. In an embodiment, if the audio signal is received with video, an audio extraction module extracts the audio from the video in order to process the audio and video components separately. In an embodiment, the detection system applies speech-to-text NLP algorithms to the audio signals to generate a text transcription of the incoming audio. In some embodiments, the detection system then applies additional NLP algorithms and/or ML algorithms to extract grammatical features of the dialogue (e.g., to identify tone, sentiment, etc.), eliminate noise, identify references to topics related to various types of emergency situations, and classifies the audio according to likelihood of sounding like a potential emergency. In an embodiment, the audio is received with video in a combined audio/video signal. In an embodiment, the detection system subjects the video signal to a frame extraction module, and then processes the frames using a DNN to classify the images according to likelihood of showing a potential emergency. In some embodiments, the detection system includes a fusion unit to align the processed audio and video and generate a combined score indicative of the likelihood of the audio/video being a recording of an emergency based on the individual audio and video classification scores.

In an illustrative embodiment, the detection system receives audio signals from a microphone or other audio sensor that is monitoring the user. In an embodiment, the sensors generate audio signals that are monitored by human agents who listen for signs of an emergency.

The safety monitoring system includes a verification system that automatically performs a verification process once the system detects a potential emergency. When the system verifies an emergency, it automatically contacts emergency services to request dispatch of emergency personnel to the user's location. In an embodiment, the system will err on the side of user safety and contact emergency services when it is unable to verify the detected potential emergency.

In an embodiment, the system attempts to verify a potential emergency by transmitting a verification request, which can include prompting the user for confirmation, for example by generating a user interface with instructions for the user to follow to confirm whether an actual emergency situation has occurred. There are various ways this can be accomplished. Non-limiting examples include presenting the user with a confirmation button to press; presenting the user with a text message with instructions to send a reply text or contact the monitoring service in some other way; presenting the user with a keypad on which the user can enter a pin code to signal that there is no emergency, which may include an option for the user to input a false pin number that appears to clear the alarm, but instead alerts the monitoring service that there is an ongoing emergency.

In an embodiment, the system attempts to verify a potential emergency by transmitting a verification request, which can include contacting a third party, for example using predetermined contact information. Such embodiments require the user to have already registered a third party as an emergency contact. If the system is able to reach a pre-registered third party, the system will ask for the third party's assistance in determining whether an actual emergency has occurred. There are several different types of requests that can be made of the third party to assist with the verification process. Non-limiting examples of verification requests that the system may make to the third party include contacting the third party via a live operator, an automated telephone call, and/or a text message and ask the third party to attempt to verify the emergency by contacting the user and/or ask the third party to review audio/video recordings and provide input as to whether the audio and/or video indicates an actual emergency based on their familiarity with the user. In an embodiment, if the system is unable to reach the user and the third party (or no third party is provided), the system will err on the side of user safety and treat the potential emergency as verified and then contact emergency services.

In an illustrative embodiment, the safety monitoring system includes a notification system that automatically contacts emergency services to request dispatch of emergency personnel to the user's location. In an embodiment, the notification system also performs additional tasks as previously defined by the user. For example, the user may define additional tasks such as notifying a family member, a friend, an employer, or a doctor; the user may request that emergency responders be made aware of an allergy, medications, current medical condition, or medical history.

In an embodiment, the safety monitoring system is integrated with the user's vehicle, such as where the user is a service driver. The vehicle integration allows the monitoring system to perform additional actions involving the vehicle. For example, the vehicle integration allows the notification system to perform preauthorized actions on the user's vehicle, such as flashing lights, honking horn, engaging a self-driving process, or shutting the vehicle down. In an embodiment, the monitoring system user is the safety monitoring system is able to detect that the user is a service driver and has an aggressive passenger in the back seat. The vehicle integration allows the monitoring system to lock the aggressor in the vehicle, but unlock only the driver door to let the user to exit the vehicle.

In some embodiments, if the notification system is able to establish contact with the user, the notification system gathers details about the emergency prior to contacting emergency services, allowing the notification system to make a more specific request for assistance, for example to specifically request police, paramedics, fire rescue, roadside assistance, a replacement service vehicle, a tow truck, and/or a rental vehicle. The notification system also confirms the vehicle's current location, the vehicle description, and any special instructions to aid in dispatching the correct responders and aid responders in locating the vehicle. In some embodiments, if the user is in contact with the notification system but injured, the notification system may have a live operator join the line to stay on the line with the injured user until emergency services arrives.

In some embodiments, the safety monitoring system monitors the user for a potential emergency, automatically attempts to verify whether the potential emergency is, or is not, an actual emergency situation, and, unless the monitoring system verifies that the potential emergency is not an actual emergency situation, automatically requests dispatch of emergency services to the user's location. In some such embodiments, the safety monitoring system monitors the user for a potential emergency in any one of a plurality of severity classifications. In some such embodiments, the monitoring system detects both the potential emergency and the severity classification of the emergency, and automatically attempts to verify whether the potential emergency is, or is not, an actual emergency situation. In some such embodiments, the monitoring system detects the severity classification of the emergency using an ML model to classify the potential emergency into one of a plurality of severity classifications. In some such embodiments, the monitoring system also automatically attempts to verify the severity classification of the potential emergency. In some such embodiments, the system provides verified severity classification information to emergency services.

In some embodiments, the safety monitoring system monitors the user for a potential emergency in any one of a plurality of severity classifications, and, without regard to the severity classification, automatically attempts to verify whether the potential emergency is, or is not, an actual emergency situation, and, unless the monitoring system verifies that the potential emergency is not an actual emergency situation, automatically requests dispatch of emergency services to the user's location. In some such embodiments, the monitoring system attempts to verify the potential emergency and, as part of the verification process, attempt to determine the severity classification of the emergency. In some such embodiments, the monitoring system attempt to determine the severity classification of the emergency using an ML model to classify the potential emergency into one of a plurality of severity classifications. In some such embodiments, the system provides any determined severity classification information to emergency services.

In an embodiment, the safety monitoring system is provided as part of an e-commerce application for all of the application's users. In an embodiment, the safety monitoring system is a stand-alone application that allows a new customer to create an account and thereby become a user. In an embodiment, the safety monitoring system detects when a first user and a second user, who may or may not know each other, have scheduled a meeting with each other and have each set up respective monitoring sessions for the meeting. In an embodiment, each of the first and second users have location devices, such as GPS devices, that can detect and transmit location information to other systems. The system has a detection system that is in communication with the location devices of the first and second users. In an embodiment, the detection system detects the beginning of the meeting based on the proximity of the location devices of the first and second users. In some such embodiments, the detection system uses the proximity of the two location devices as a trigger to begin the monitoring session only if pre-approved by both users. In some such embodiments, the detection system detects the beginning of the meeting based on the proximity of the location devices being such that the first and second users have arrived at a same location, such as a having both arrived at the same restaurant, the same retailer, the same house, or the same place of business. Alternatively. in some such embodiments, the detection system detects the beginning of the meeting based on the proximity of the location devices being such that the first and second users are close to each other, for example within 20 feet of each other, or within 15 feet of each other, or within 10 feet of each other, or within 5 feet of each other, or within some other distance set by a user or developer.

In an embodiment, the system comprises a detection system that includes a monitoring sensor for monitoring a user by generating media that is transmitted to a cognitive media evaluation system. The evaluation system receives and processes the media to detect a potential emergency. The system includes a verification system that automatically attempts to verify whether the detected potential emergency is an actual emergency situation by requesting verification from at least one of the two users. The system will automatically contact emergency services when an actual emergency is verified. In an embodiment, the system will err on the side of user safety and contact emergency services when it is unable to verify the detected potential emergency.

In some embodiments, the safety monitoring system monitors both the first and second users for a potential emergency. In some embodiments, the first and second users provide location information and duration information, indicating that both of the first and second users should be in a specific area for a certain amount of time. If the first or second user prematurely appears to leave the area, the monitoring system will treat the early departure as an indication of a possible emergency. Similarly, if the distance between the two users exceeds a threshold value before the meeting is scheduled to end, the monitoring system will treat the distance as an indication of a possible emergency. If the first or second user prematurely appears to leave the area, the monitoring system will treat the early departure as an indication of a possible emergency. In some embodiments, if the users decide to end the meeting early, the system provides an interface that allows the meeting to end early without it being treated as a potential emergency.

In some embodiments, the safety monitoring system monitors both the first and second users for a potential emergency that affects both users. The system also monitors both users for potential emergencies that affect only one or the other user.

In some embodiments, if an emergency is detected affects only one of the two users, the system will determine whether to alert the other user. In some situations, the emergency faced by the first user may be because of aggression by the second user, so the system does not notify the second user but does proceed with requesting dispatch of emergency services to the location of the two users.

For the sake of clarity of the description, and without implying any limitation thereto, embodiments are described using some example configurations. From this disclosure, those of ordinary skill in the art will be able to conceive many alterations, adaptations, and modifications of a described configuration for achieving a described purpose, and the same are contemplated within the scope of an embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
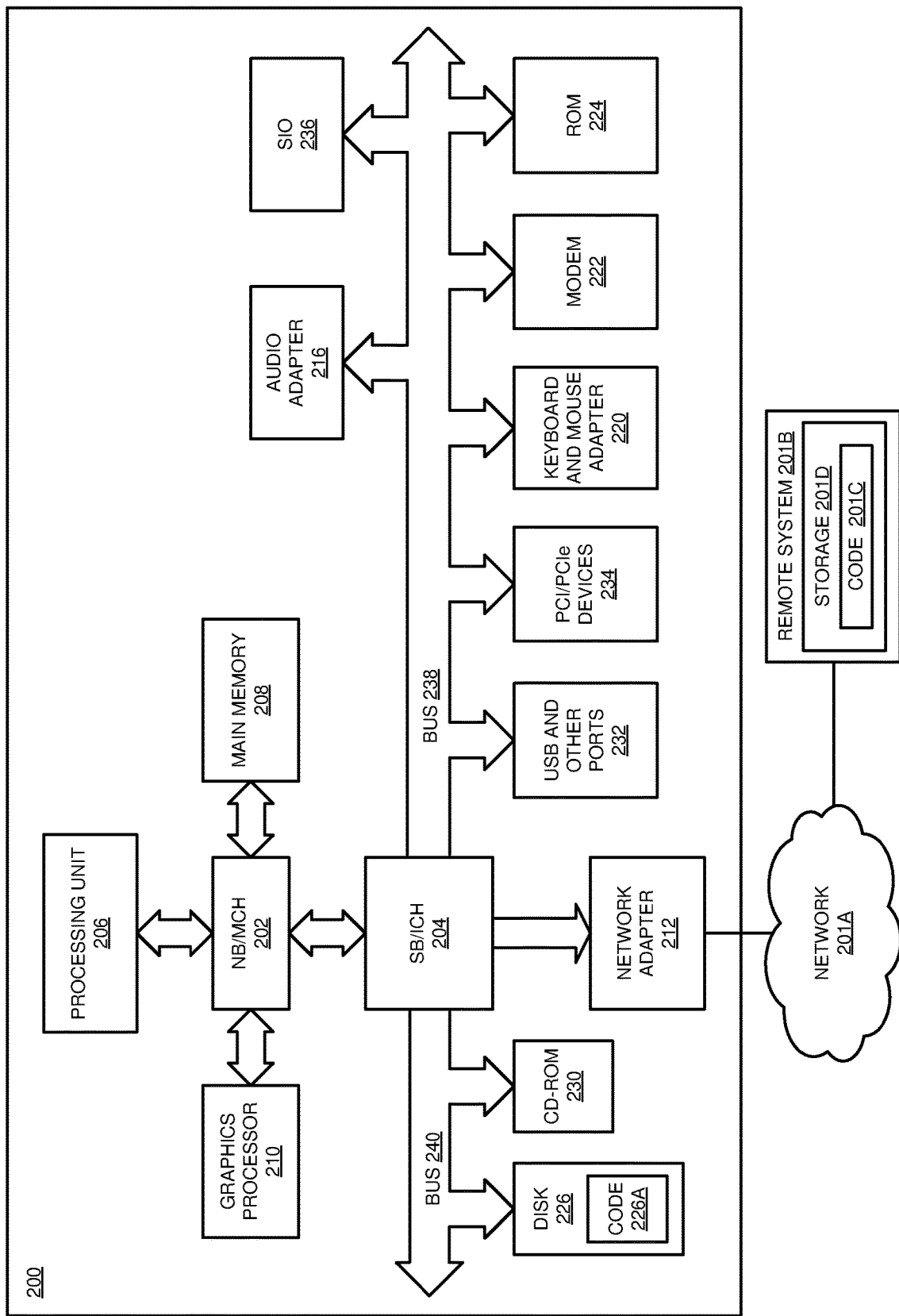
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110 and 112 are also coupled to network 102. A conventional data processing system, such as server 106, or client 110 or 112 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110 and 112 are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems, such as conventional data processing system 106 and clients 110 and 112 also represent example nodes in a cluster, partitions, and other configurations suitable for implementing an embodiment.

Device 132 and automobile computer system 152 are examples of conventional computing devices described herein. For example, device 132 can take the form of a smartphone, a tablet computer, a laptop computer, client 110 in a stationary or a portable form, or any other suitable device. In an embodiment, device 132 is in communication with a wearable computing device 142, such as a fitness monitor or smart watch. In an embodiment, the wearable computing device 142 communicates with the server 106 via the device 132. The wearable computing device 142 communicates with device 132, e.g., over short-range radio, such as Bluetooth® (BLUETOOTH is a registered trademark of Bluetooth SIG, Inc., Kirkland, Wash., U.S.A.), over a wired or wireless local area network (LAN), or over a wide area network (WAN). In an embodiment, device 132, wearable computing device 142, and automobile computer system 152 send requests to server 106 to perform one or more data processing tasks by neural network application 105B such as initiating processes described herein of the neural network. Any software application described as executing in another conventional data processing system in FIG. 1 can be configured to execute in device 132, wearable computing device 142, or automobile computer system 152 in a similar manner. Any data or information stored or produced in another conventional data processing system in FIG. 1 can be configured to be stored or produced in device 132, wearable computing device 142, or automobile computer system 152 in a similar manner.

Device 132 includes camera 134 and a microphone 136. Camera 134 is an example of an image sensor, camera apparatus, image-capturing apparatus, or video-capturing apparatus, and microphone 136 is an example of an audio sensor. Camera 134 and microphone 136 can also be installed in any of data conventional data processing systems 106, clients 110 and 112, wearable computing device 142, and automobile computer system 152. Camera 134 and microphone 136 can also be a stand-alone device, for example a hand-held or mounted video camera and/or microphone.

Application 105 implements an embodiment described herein. Application 105 can use camera 134 and microphone 136 to monitor a scene. Application 105 can also execute in any of data processing systems 104, 106, 110 and 112, wearable computing device 142, and automobile computer system 152, and need not execute in the same system as camera 134 and microphone 136.

Server 106, storage unit 108, data processing system 104, and clients 110 and 112, device 132, wearable computing device 142, and automobile computer system 152 may couple to network 102 using wired connections, wireless communication protocols, or other suitable data connectivity. Clients 110 and 112 may be, for example, personal computers or network computers.

In the depicted example, server 106 may provide data, such as boot files, operating system images, and applications to clients 110 and 112, wearable computing device 142, and automobile computer system 152. Clients 110 and 112, wearable computing device 142, and automobile computer system 152 may be clients to server 106 in this example. Clients 110 and 112, wearable computing device 142, and automobile computer system 152, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple Graphics Processing Units (GPUs) 107 including multiple nodes in which each node may include one or more GPUs as described herein. In an embodiment, the GPUs 107 include programmable logic chips (processors) specialized for display functions for rendering images, animations and video for the computer screens. The GPUs 107 are capable of performing parallel operations on multiple sets of data, and are useful as vector processors for non-graphics applications that involve repetitive computations.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN).

FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110 and 112, wearable computing device 142, and automobile computer system 152 in FIG. 1, or another type of device in which computer usable program code or instructions implementing the processes may be located for the illustrative embodiments.

Data processing system 200 is also representative of a conventional data processing system or a configuration therein, such as conventional data processing system 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
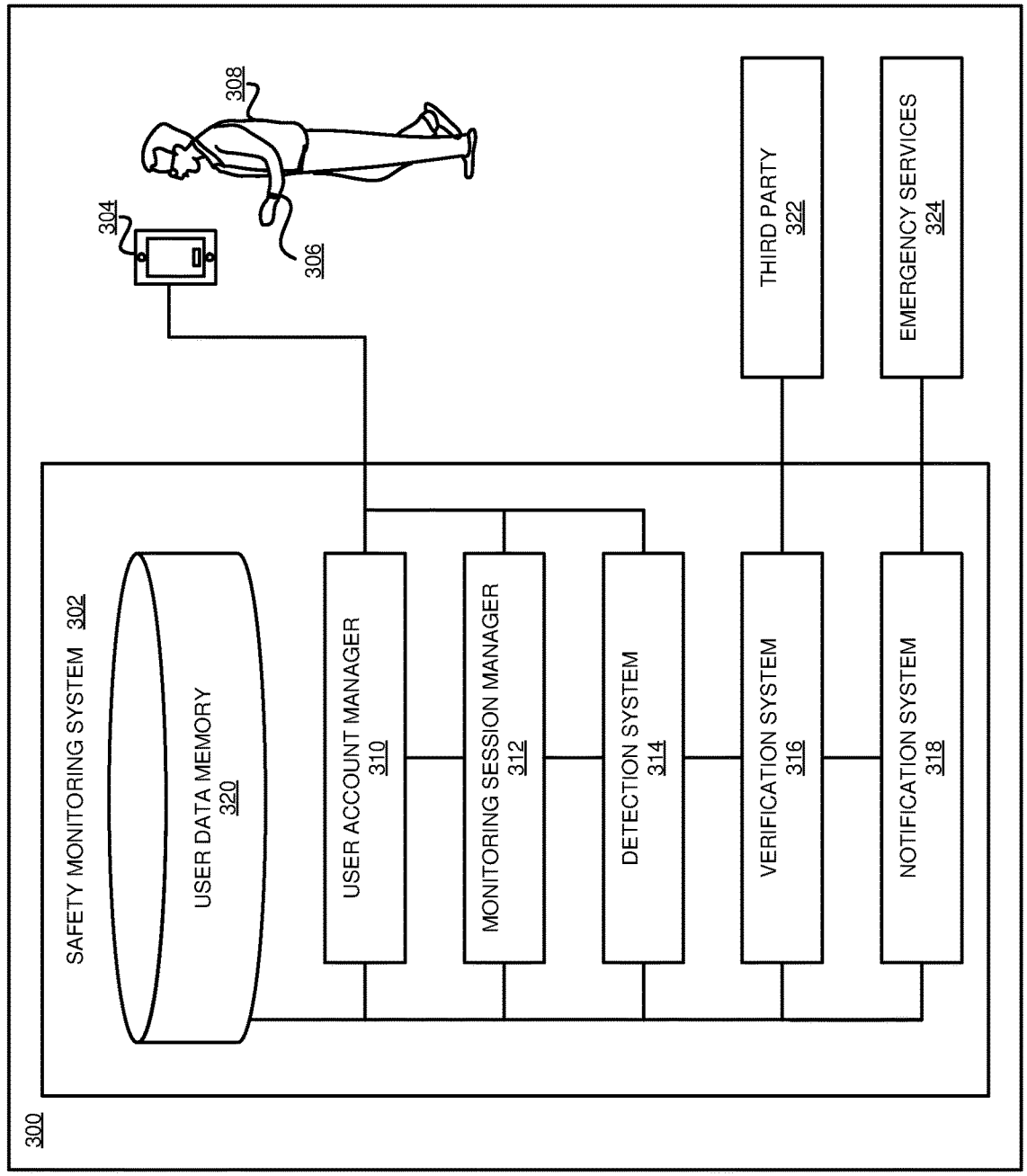
FIG. 3 depicts a block diagram of an example configuration for automatically detecting and responding to emergency situations in accordance with an illustrative embodiment.

With reference to FIG. 3, this figure depicts block diagram of an example configuration 300 for automatically detecting and responding to emergency situations. In the illustrative embodiment, the configuration 300 includes a safety monitoring system 302 in communication with a smartphone 304 and fitness monitor 306, which are both carried by a user 308. The safety monitoring system 302 is an example of application 105A, 105B in FIG. 1 running on a processing system 104 or a server 106. The smartphone 304 is an example of device 132 and the fitness monitor 306 is an example of the wearable computing device 142 shown in FIG. 1.

In an embodiment, the safety monitoring system 302 is a processor-based system that includes a user account manager 310, a monitoring session manager 312, a detection system 314, a verification system 316, a notification system 318, and a user data memory 320. In an embodiment, the user account manager 310 establishes a network connection with a user's mobile device, such as a smartphone 304, when the user creates a new account or requests a change to the user's existing account. When the account manager 310 detects that the user is setting up a new account, the account manager 310 transmits prompts to the user's smartphone 304 to prompt the user to provide information for creating the account, including contact information for a third party 322 emergency contact. When the account manager 310 detects that the user has an existing account, the account manager 310 prompts that user to indicate whatever changes the user wants to make, and the account manager 310, upon receiving a response from the user's smartphone 304, updates the user's account accordingly. The user account manager 310 stores the user's account information in the user data memory 320. If the user is requesting a change to existing account information, the account manager 310 updates the user data memory 320 accordingly.

In an embodiment, the monitoring session manager 312 detects a request from a user to take any of several possible actions in connection with monitoring sessions. For example, the monitoring session manager 312 receives network communication from the user and parses the communication to determine a type of action that the user is requesting. Examples of possible actions include scheduling, starting, ending, or amending monitoring sessions. If the user is requesting the scheduling of a future monitoring session, the monitoring session manager 312 prompts the user for relevant information, such as start and end times, dates, and location. Upon receiving the user's responses, the monitoring session manager 312 stores the information in the user data memory 320 and sets a monitoring session flag to commence for the requesting user at the time and data requested. The user can also request impromptu monitoring sessions that begin upon request, and can inform the system of changes to existing scheduled monitoring sessions.

Figure 4:
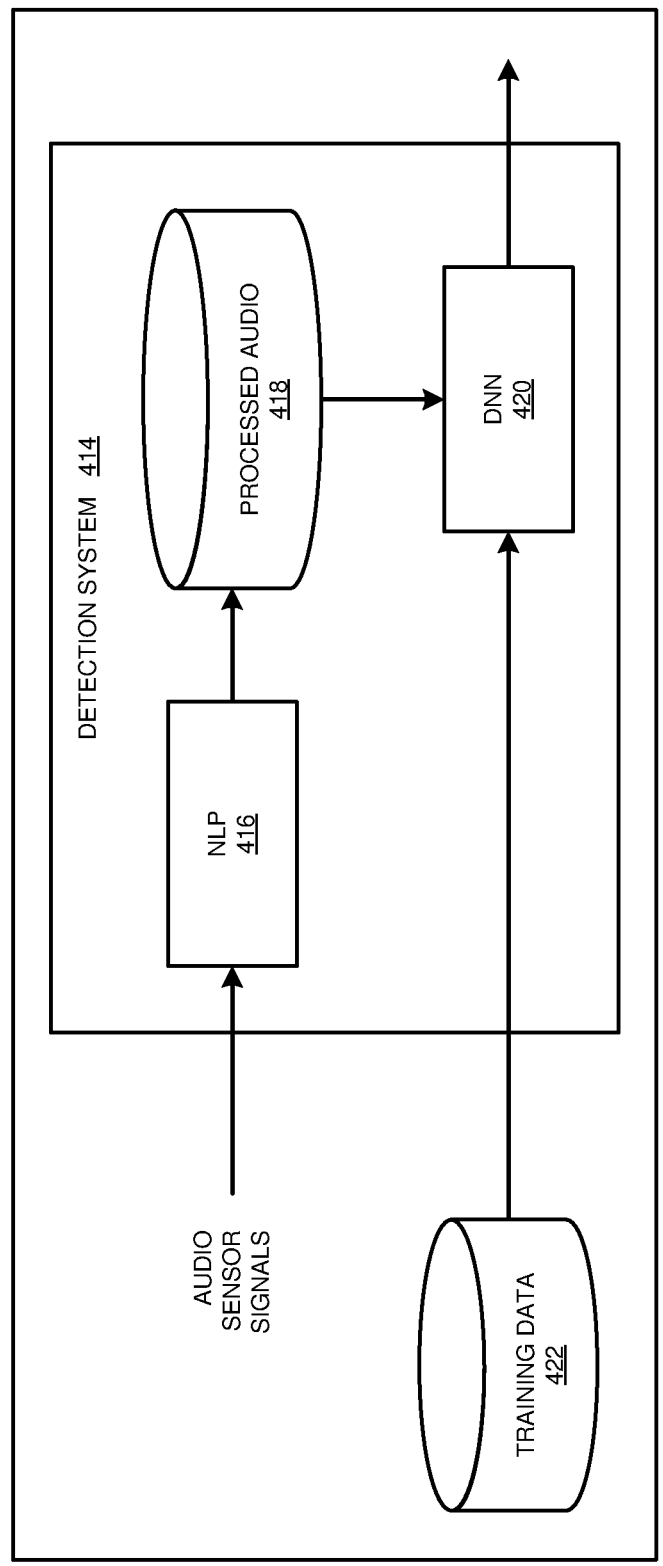
FIG. 4 depicts an example of a detection system in accordance with an illustrative embodiment.
Figure 5:
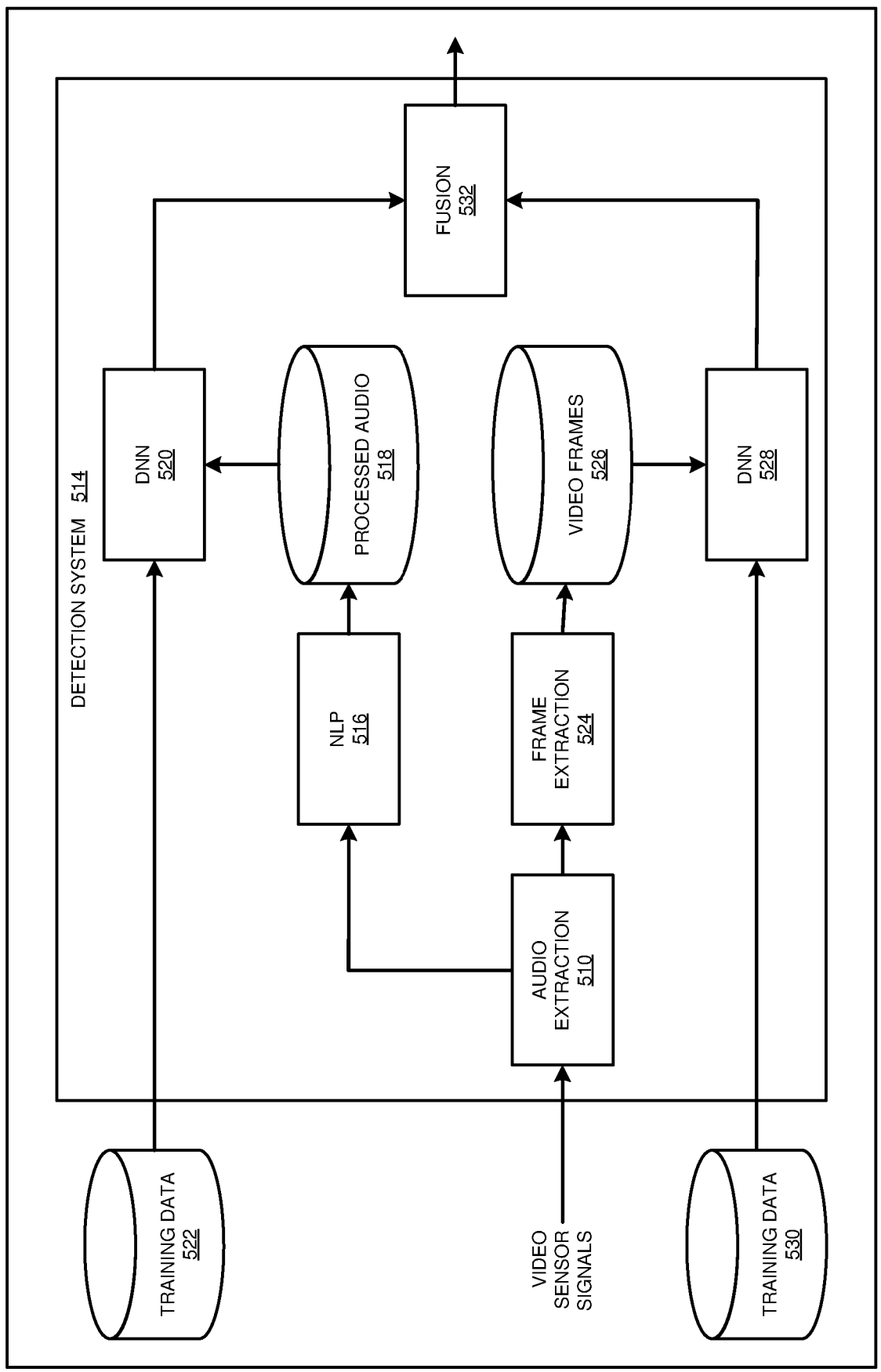
FIG. 5 depicts an example of a detection system in accordance with an illustrative embodiment.

Embodiments of the monitoring session manager 312 obtain informed consent from the user to collect information and monitor the user such that the user must "opt-in" and explicitly agree to being monitored prior to initiating a monitoring session or any monitoring occurring; similarly, embodiments of the monitoring session manager 312 allow the user to opt-out of any such monitoring, which would result in no such monitoring taking place unless and until the user opts-in and allows monitoring to occur. In some embodiments, the monitoring session manager 312 transmits a notification to the user prior to each time it collects, or uses user-collected, information about the user, and the notification includes an ability for the user to allow or prevent such activity to occur. In an embodiment, the detection system 314 is in communication with the smartphone 304 in response to the monitoring session manager 312 initiating a monitoring session. The detection system 314 receives sensor signals from one or more monitoring sensors while a monitoring session is active. For example, in an embodiment, the detection system 314 receives audio and/or video signals from the smartphone 304 and biometric information signals from the fitness monitor 306. In some embodiments, the detection system 314 includes a cognitive system that processes the incoming signals from the smartphone 304 and fitness monitor 306 to attempt to detect potential emergencies. FIGS. 4 and 5, described below, describe embodiments of the detection system 314 in greater detail.

In an embodiment, the verification system 316 receives a notification from the detection system 314 when the detection system 314 detects a potential emergency. In an embodiment, the detection system 314 responds automatically to receiving the potential emergency notification from the detection system 314 by attempting to verify whether the potential emergency is an actual emergency by transmitting a verification request and setting a time limit for receiving a response. In an embodiment, the verification system 316 transmits the verification request to a third party 322 emergency contact, for example by placing an automated, computer-generated phone call or text message using third party 322 contact information in the user data memory 320, and waiting no more than a threshold amount of time for a response from the third party 322.

In an embodiment, the notification system 318 receives a notification from the verification system 316 when the verification system 316 verifies the potential emergency. In an embodiment, the notification system 318 responds automatically to receiving the verification notification from the verification system 316 by contacting emergency services 324 and requesting dispatch to the location of the user 308. In an embodiment, the notification system 318 receives the current location or last known location of the user 308. The notification system 318 then uses a publicly-available database, for example a Master Street Address Guide, which is a database of street addresses and corresponding Emergency Service Numbers (ESNs), to find the contact information for the emergency service agency designated to serve an Emergency Service Zone that includes the user's current location.

The notification system 318 will then contact the appropriate emergency service agency and request dispatch to the user's location.

With reference to FIG. 4, this figure depicts block diagram of an example detection system 414 for detecting a potential emergency from audio sensor signals. In the illustrative embodiment, the detection system 414 includes an NLP module 416 that receives audio sensor signals from the user. In an embodiment, the NLP module 416 outputs processed audio to memory 418, which acts as a buffer while the processed audio is further processed by a DNN module 420.

In an embodiment, the NLP module, the detection system receives audio signals from a microphone or other audio sensor that is monitoring the user. In an embodiment, the NLP module 416 applies speech-to-text NLP algorithms to generate a text transcription of the incoming audio. In some embodiments, NLP module 416 stores the transcription in the processed audio memory 418. In an embodiment, a DNN 420 receives the transcription from the memory 418 and applies machine learning algorithms to extract grammatical features of the dialogue (e.g., to identify tone, sentiment, etc.), eliminate noise, identify references to topics related to various types of emergency situations, and output a score indicative of whether the audio is a recording of an emergency situation. In an embodiment, the DNN 422 using public databases, a pretrained model, and/or historical data from the detection system 414 designed to train the DNN algorithm to identify indicators of emergency situations.

With reference to FIG. 5, this figure depicts block diagram of an example detection system 514 for detecting a potential emergency from audio/video sensor signals. In the illustrative embodiment, the detection system 514 includes an audio extraction module 510 for separating the audio signals from the video signals.

In an embodiment, the audio extraction module 510 outputs the audio to an NLP module 516. The NLP module 516, processed audio memory 518, DNN 520, and training data 522 are substantially the same as NLP module 416, processed audio memory 418, DNN 420, and training data 422, except that the DNN 520 output the score to a fusion module 530.

In an embodiment, the audio extraction module 510 outputs the video signal to a frame extraction unit 524. The frame extraction unit 524 extracts and groups frames of the video signal for processing, and then stores the frames in a video frames memory 526. In an embodiment, a DNN 528 receives and processes groups of frames for image classification, and generates an indication of a potential emergency based on the prediction made by the internal classifier model in response to the input frames. In an embodiment, the DNN 528 includes a Convolutional Neural Network (CNN) or multiple DNNs. During the configuration process, the detection system uses training data 530 to train the DNN using labelled images of various emergency and non-emergency situations to train the classification model to classify images as emergencies and output a score indicative of whether the video shows images of an emergency situation. In some embodiments, the detection system 514 includes a fusion unit 530 to align the processed audio and video and generate a combined score indicative of the likelihood of the audio/video signal being a recording of a potential emergency based on the individual audio and video classification scores.

Figure 6:
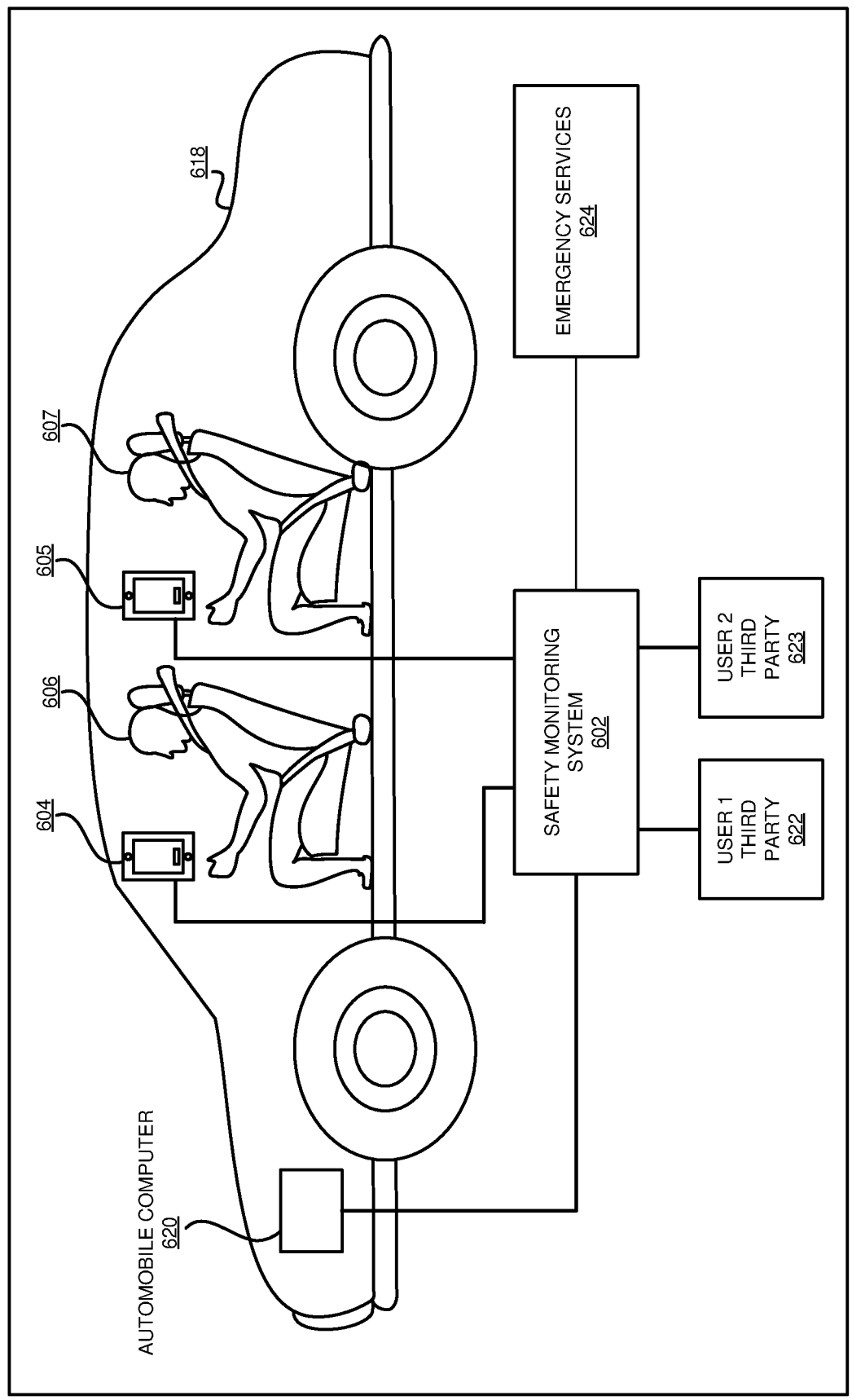
FIG. 6 depicts a block diagram of an example configuration for automatically detecting and responding to emergency situations in accordance with an illustrative embodiment.

With reference to FIG. 6, this figure depicts block diagram of an example multi-user configuration for automatically detecting and responding to emergency situations. In the illustrative embodiment, a first user 604 and a second user 605 are both users of the safety monitoring system 602. The safety monitoring system 602 is substantially the same as the safety monitoring system 302 shown in FIG. 3 in that safety monitoring system 602 is a processor-based system that includes a user account manager 310, a monitoring session manager 312, a detection system 314, a verification system 316, a notification system 318, and a user data memory 320.

In an embodiment, safety monitoring system 602 is in communication with the smartphone 604 of the first user and the smartphone 605 of the second user. In an embodiment, each of the first and second smartphones 604 and 605 have location devices, such as GPS devices, that can detect and transmit location information to other systems. Safety monitoring system 602 is in communication with the location devices of the first and second users 606 and 607. In an embodiment, safety monitoring system 602 detects the beginning of the meeting based on the proximity of the location devices of the first and second smartphones 604 and 605. In some such embodiments, safety monitoring system 602 uses the proximity of the two smartphones 604 and 605 as a trigger to begin the monitoring session only if pre-approved by both users. In some such embodiments, safety monitoring system 602 detects the beginning of the meeting based on the proximity of the location devices being such that the first and second users have arrived at a same location, such as a having both arrived at the same restaurant, the same retailer, the same house, or the same place of business. Alternatively. in some such embodiments, safety monitoring system 602 detects the beginning of the meeting based on the proximity of the smartphones 604 and 605 being such that the first and second users 606 and 607 are close to each other, for example within 20 feet of each other, or within 15 feet of each other, or within 10 feet of each other, or within 5 feet of each other, or within some other distance set by a user or developer.

In an embodiment, safety monitoring system 602 is like safety monitoring system 302 in that safety monitoring system 602 receives and processes monitoring signals from sensors on the users, such as media and biometric signals, to detect a potential emergency. Safety monitoring system 602 includes a verification system that automatically attempts to verify whether the detected potential emergency is an actual emergency situation by requesting verification from at least one of the two users, for example by contacting a third party emergency contact 622 associated with the first user 606 and/or by contacting a third party emergency contact 623 associated with the second user 607. The system will automatically contact emergency services 624 when an actual emergency is verified. In an embodiment, the system will err on the side of user safety and contact emergency services 624 when it is unable to verify the detected potential emergency.

In some embodiments, safety monitoring system 602 monitors both the first and second users 606 and 607 for a potential emergency. In some embodiments, the first and second users 606 and 607 provide location information and duration information, indicating that both of the first and second users 606 and 607 should be in a specific area for a certain amount of time. If the first or second user 606 or 607 prematurely appears to leave the area, safety monitoring system 602 will treat the early departure as an indication of a possible emergency. Similarly, if the distance between the two users 606 and 607 exceeds a threshold value before the meeting is scheduled to end, safety monitoring system 602 will treat the distance as an indication of a possible emergency. If the first or second user 606 or 607 prematurely appears to leave the area, safety monitoring system 602 will treat the early departure as an indication of a possible emergency. In some embodiments, if the users 606 and 607 decide to end the meeting early, safety monitoring system 602 provides an interface that allows the users 606 and 607 to confirm that the meeting will end early without it being treated as a potential emergency.

In some embodiments, safety monitoring system 602 monitors both the first and second users 606 and 607 for a potential emergency that affects both users. Safety monitoring system 602 also monitors both users for potential emergencies that affect only one or the other user. In some embodiments, if an emergency is detected affects only one of the two users 606 and 607, safety monitoring system 602 will determine whether to alert the other user. In some situations, the emergency faced by the first user 606 may be because of aggression by the second user 607, so safety monitoring system 602 does not notify the second user 607 but does proceed with requesting dispatch of emergency services 624 to the location of the two users 606 and 607.

In an embodiment, safety monitoring system 602 is integrated with or in communication with the user's vehicle 618, such as where the first user 606 is a service driver. The vehicle integration allows safety monitoring system 602 to communicate with the automobile computer 620 and instruct it to perform actions such as a controlled stop, locking/unlocking the doors, raising/lowering windows, and/or opening the trunk. For example, the vehicle integration allows safety monitoring system 602 to instruct the automobile computer 620 to perform preauthorized actions on the user's vehicle 618, such as flashing lights, honking horn, engaging a self-driving process, or shutting the vehicle down. In an embodiment, safety monitoring system 602 unlocks the front doors and locks the back doors of the vehicle 618 if the first user 606 is in danger because of the second user 607 in the back seat. This allows the first user 606 to exit the vehicle 618 to get a safer distance from the aggressor while emergency services is in route.

Figure 7:
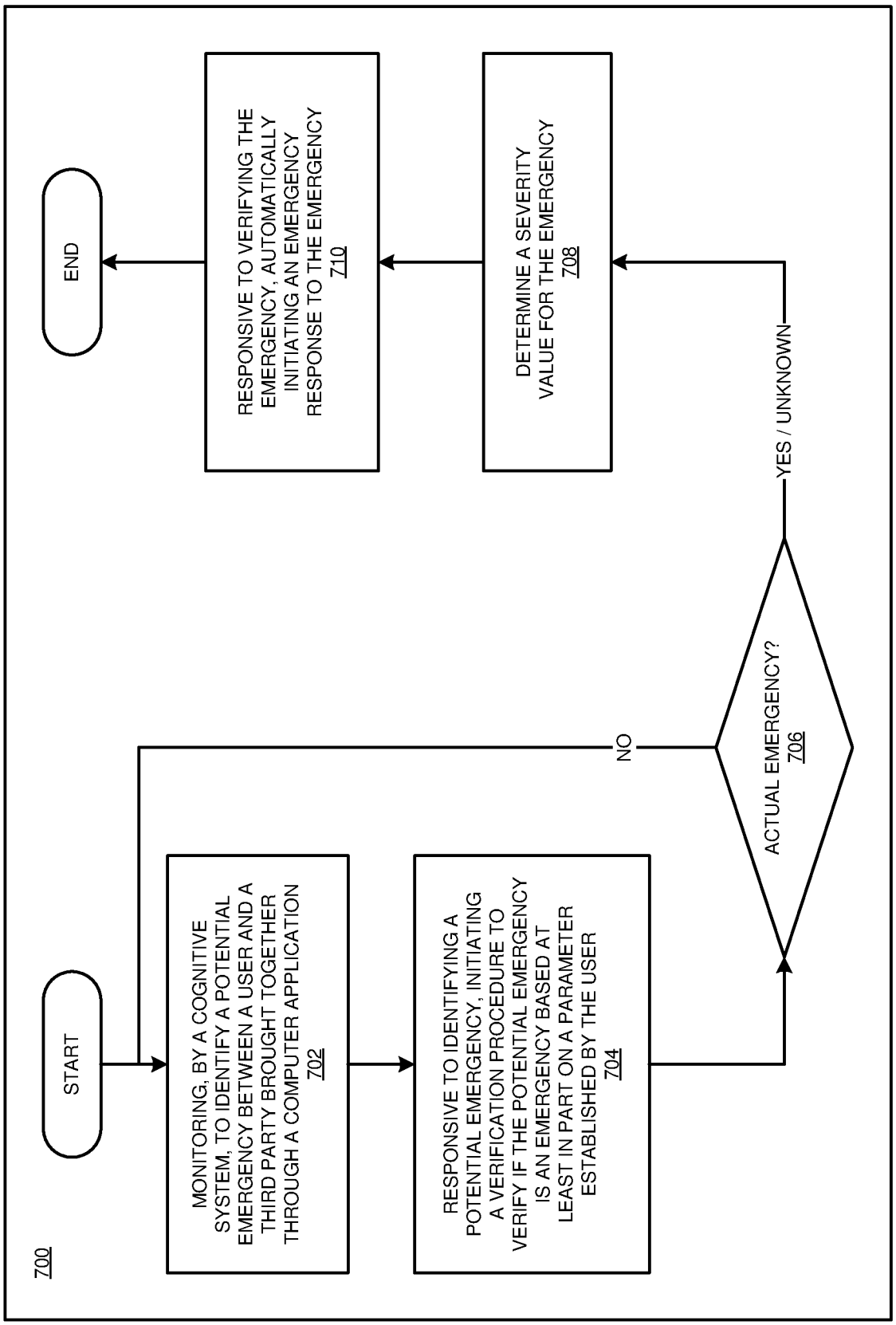
FIG. 7 depicts a flowchart of an example process for automatically detecting and responding to emergency situations in accordance with an illustrative embodiment.

With reference to FIG. 7, this figure depicts a flowchart of an example process for detecting and responding to emergency situations in accordance with an illustrative embodiment. Process 700 can be implemented in safety monitoring system 302 in FIG. 3 and in safety monitoring system 602 in FIG. 6.

In block 702, the system monitors, using a cognitive system, sensor signals from a sensor carried by a user to identify a potential emergency between the user and a third party, for example brought together through a computer application. In block 704, the system responds to an identified potential emergency by initiating a verification procedure to verify if the potential emergency is an actual emergency based at least in part on a parameter established by the user, such as by confirming with a third party emergency contact or by a prompt on the user's smartphone. At block 706, the system checks whether the potential emergency is an actual emergency by transmitting a verification request and, upon detecting a lack of response or an emergency-confirmation response to the verification request within a predetermined amount of time, confirming the potential emergency as an actual emergency (Yes/Unknown from block 706) and the process continues to block 708. Otherwise, if the verification system receives a no-emergency response (indicating that there is no emergency) to the verification request within the predetermined amount of time (No from block 706), the verification system cancels the potential emergency and monitoring continues monitoring continues at block 702. At block 708, the system optionally determines a severity of the emergency either while detecting a potential emergency or during the verification process. At block 710, responsive to verifying the emergency, the automatically initiates an emergency response to the emergency, including contacting emergency services and requesting dispatch to the user's location, and then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
  receiving, by a processor, a sensor signal from a monitoring sensor during a scheduled monitoring session for monitoring a first user;
  processing, by the processor, the sensor signal using a machine learning (ML) model such that the ML model outputs an indication of whether the first user is experiencing a potential emergency;
  performing, by the processor in response to the ML model indicating that the first user is experiencing a potential emergency, a verification routine that includes transmitting a verification request and, upon detecting a lack of response to the verification request within a predetermined amount of time, confirming the potential emergency as an actual emergency;
  requesting, by the processor automatically in response to the verification routine confirming that the potential emergency is an actual emergency, dispatch of emergency services to a location of the first user;
  receiving, by the processor, a first request from the first user to schedule a monitoring session;
  receiving, by the processor, location information for the first user from a first location device;
  receiving, by the processor, a second request from a second user, to schedule a monitoring session;
  receiving, by the processor, location information for the second user from a second location device; and
  recognizing, by the processor, that the first and second requests relate to a meeting between the first and second users.

2. The method of claim 1, wherein the performing of the verification routine includes, upon receiving an emergency-confirming response to the verification request within the predetermined amount of time, confirming the potential emergency as the actual emergency.

3. The method of claim 1, further comprising:
  detecting, by the processor, a beginning of the meeting between the first and second users based on the location information for the first and second users indicating that the first and second users have both arrived at a same location.

4. The method of claim 1, further comprising:
  detecting, by the processor, an end of the meeting between the first and second users based on the location information for the first and second users indicating that the first and second users are more than a threshold distance away from each other.

5. The method of claim 4, further comprising:
  determining, by the processor, whether the first and second users are experiencing potential emergencies based at least in part on a comparison of a time of the detected end of the meeting and a previously-indicated planned time for the end of the meeting.

6. The method of claim 5, further comprising:
  performing, by the processor in response to determining that the first and second users are experiencing potential emergencies, the verification routine to confirm whether the potential emergencies are actual emergencies.

7. The method of claim 1, wherein the verification request is sent to a third party who was previously registered by the first user as an emergency contact.

8. The method of claim 1, wherein the monitoring sensor comprises a microphone and the sensor signal comprises an audio signal, and
  wherein the processing of the sensor signal comprises natural language processing (NLP), such that the NLP processing results in a transcription of the audio signal, and ML processing, such that the ML processing results in an indication of a likelihood of an emergency happening in the audio.

9. The method of claim 8, wherein the monitoring sensor further comprises a camera and the sensor signal further comprises a video signal, and
  wherein the processing of the sensor signal comprises:
  extracting frames from the video signal; and
  ML processing, such that the ML processing results in an indication of a likelihood of an emergency happening in the video.

10. A computer usable program product comprising a computer-readable storage device, and program instructions stored on the storage device, the stored program instructions comprising:
  program instructions to receive, by a processor, a sensor signal from a monitoring sensor during a scheduled monitoring session for monitoring a first user;
  program instructions to process, by the processor, the sensor signal using a machine learning (ML) model such that the ML model outputs an indication of whether the first user is experiencing a potential emergency;
  program instructions to perform, by the processor in response to the ML model indicating that the first user is experiencing a potential emergency, a verification routine that includes transmitting a verification request and, upon detecting a lack of response to the verification request within a predetermined amount of time, confirming the potential emergency as an actual emergency;
  program instructions to request, by the processor automatically in response to the verification routine confirming that the potential emergency is an actual emergency, dispatch of emergency services to a location of the first user;
  program instructions to receive, by the processor, a first request from the first user to schedule a monitoring session;

program instructions to receive, by the processor, location information for the first user from a first location device;

program instructions to receive, by the processor, a second request from a second user, to schedule a monitoring session;

program instructions to receive, by the processor, location information for the second user from a second location device; and program instructions to recognize, by the processor, that the first and second requests relate to a meeting between the first and second users.

11. The computer usable program product of claim 10, wherein the performing of the verification routine includes, upon receiving an emergency-confirming response to the verification request within the predetermined amount of time, confirming the potential emergency as the actual emergency.

12. The computer usable program product of claim 10, wherein the monitoring sensor comprises a microphone and the sensor signal comprises an audio signal, and wherein the processing of the sensor signal comprises natural language processing (NLP), such that the NLP processing results in a transcription of the audio signal, and ML processing, such that the ML processing results in an indication of a likelihood of an emergency happening in the audio.

13. The computer usable program product of claim 12, wherein the monitoring sensor further comprises a camera and the sensor signal further comprises a video signal, and wherein the processing of the sensor signal comprises:

extracting frames from the video signal; and

ML processing, such that the ML processing results in an indication of a likelihood of an emergency happening in the video.

14. A computer system comprising a processor, a computer-readable memory, and a computer-readable storage device, and program instructions stored on the storage device for execution by the processor via the memory, the stored program instructions comprising:

program instructions to receive, by the processor, a sensor signal from a monitoring sensor during a scheduled monitoring session for monitoring a first user;

program instructions to process, by the processor, the sensor signal using a machine learning (ML) model such that the ML model outputs an indication of whether the first user is experiencing a potential emergency;

program instructions to perform, by the processor in response to the ML model indicating that the first user is experiencing a potential emergency, a verification routine that includes transmitting a verification request and, upon detecting a lack of response to the verification request within a predetermined amount of time, confirming the potential emergency as an actual emergency;

program instructions to request, by the processor automatically in response to the verification routine confirming that the potential emergency is an actual emergency, dispatch of emergency services to a location of the first user;

program instructions to receive, by the processor, a first request from the first user to schedule a monitoring session;

program instructions to receive, by the processor, location information for the first user from a first location device;

program instructions to receive, by the processor, a second request from a second user, to schedule a monitoring session;

program instructions to receive, by the processor, location information for the second user from a second location device; and program instructions to recognize, by the processor, that the first and second requests relate to a meeting between the first and second users.

15. The computer system of claim 14, wherein the performing of the verification routine includes, upon receiving an emergency-confirming response to the verification request within the predetermined amount of time, confirming the potential emergency as the actual emergency.

16. The computer system of claim 14, wherein the monitoring sensor comprises a microphone and the sensor signal comprises an audio signal, and wherein the processing of the sensor signal comprises natural language processing (NLP), such that the NLP processing results in a transcription of the audio, and ML processing, such that the ML processing results in an indication of a likelihood of an emergency happening in the audio.

17. The computer system of claim 16, wherein the monitoring sensor further comprises a camera and the sensor signal further comprises a video signal, and wherein the processing of the sensor signal comprises:

extracting frames from the video signal; and

ML processing, such that the ML processing results in an indication of a likelihood of an emergency happening in the video.

* * * * *